United States Patent [19]

Yoshida et al.

[11] Patent Number: 4,865,896
[45] Date of Patent: Sep. 12, 1989

[54] COMPOSITE JOINED BODIES INCLUDING AN INTERMEDIATE MEMBER HAVING A HONEYCOMB STRUCTURE

[75] Inventors: Akiihiko Yoshida, Iwakura; Takao Soma, Nagoya, both of Japan

[73] Assignee: NGK Insulators, Ltd., Nagoya, Japan

[21] Appl. No.: 167,128

[22] Filed: Mar. 11, 1988

[30] Foreign Application Priority Data

Mar. 20, 1987 [JP] Japan .................. 62-67396

[51] Int. Cl.$^4$ .................................. B32B 3/12
[52] U.S. Cl. .................. 428/116; 428/450; 428/469; 428/698; 502/527
[58] Field of Search .......... 55/523; 502/527; 156/89, 197, 292; 428/116, 118, 450, 469, 698

[56] References Cited

U.S. PATENT DOCUMENTS

| | | | |
|---|---|---|---|
| 3,716,347 | 2/1973 | Bergstrom et al. | 428/116 X |
| 3,905,775 | 9/1975 | Sowards et al. | 428/36 X |
| 4,280,975 | 7/1981 | Amman | 428/116 X |
| 4,289,447 | 9/1981 | Sterman et al. | 428/116 X |
| 4,384,020 | 5/1983 | Beggs et al. | 428/116 X |
| 4,411,380 | 10/1983 | McWithey et al. | 428/116 X |
| 4,448,828 | 5/1984 | Mochida et al. | 428/116 X |
| 4,639,388 | 1/1987 | Ainsworth et al. | 428/469 X |
| 4,692,367 | 9/1987 | Richter | 156/89 X |
| 4,814,081 | 3/1989 | Malinowski | 428/116 X |

FOREIGN PATENT DOCUMENTS

| | | |
|---|---|---|
| 0038072 | 10/1981 | European Pat. Off. |
| 0164537 | 2/1987 | European Pat. Off. |
| 2165696 | 7/1972 | Fed. Rep. of Germany |
| 59-160533 | 10/1984 | Japan ................. 428/325 |
| 62-182170 | 8/1987 | Japan ................. 428/450 |
| 861242 | 2/1961 | United Kingdom ....... 428/116 |

Primary Examiner—Henry F. Epstein
Attorney, Agent, or Firm—Arnold, White & Durkee

[57] ABSTRACT

Composite joined bodies are disclosed wherein, each includes constituent members and an intermediate member through which the constituent members are joined together. The intermediate member is designed in a honeycomb structure.

12 Claims, 5 Drawing Sheets

*FIG.3a*          *FIG.3b*
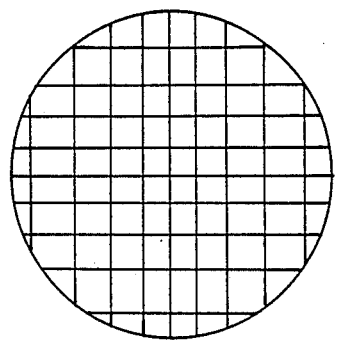 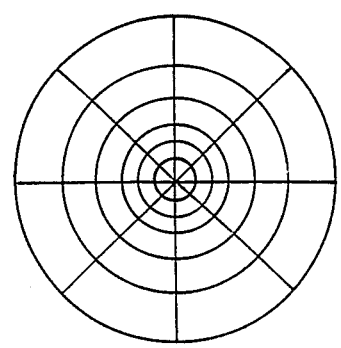
*FIG.3c*          *FIG.3d*
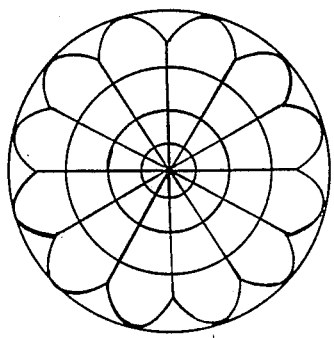 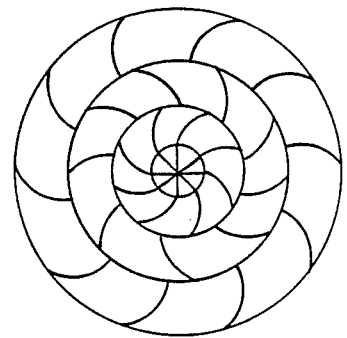
*FIG.3e*
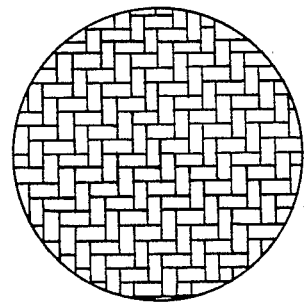

FIG._4a
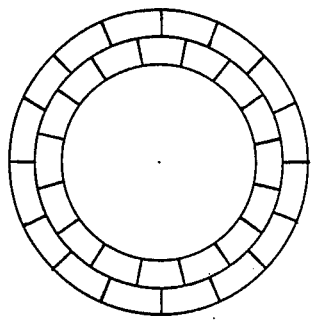
FIG._4b
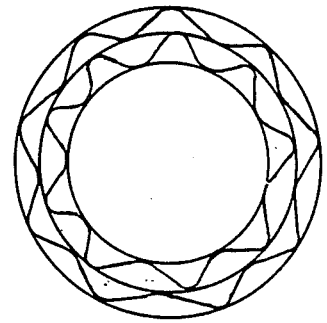
FIG._4c
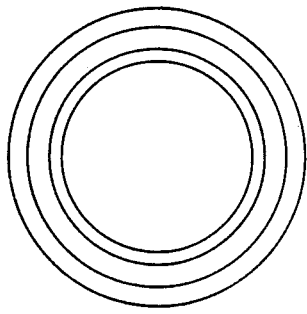
FIG._4d
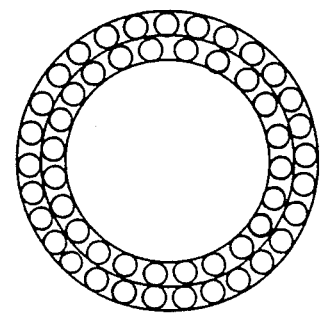

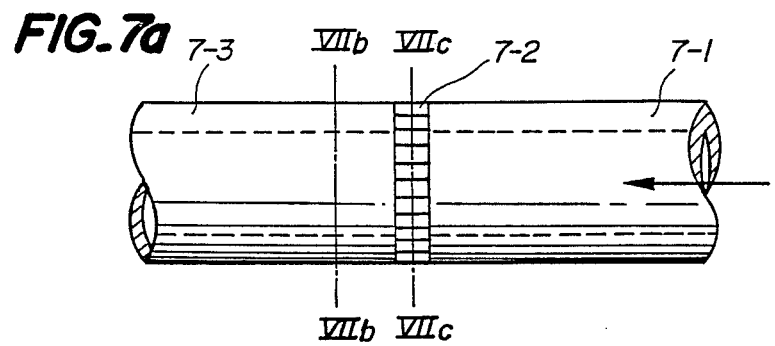
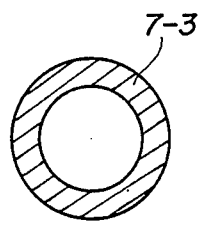 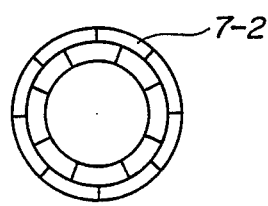
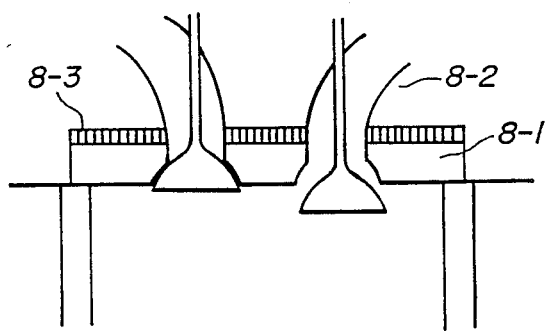 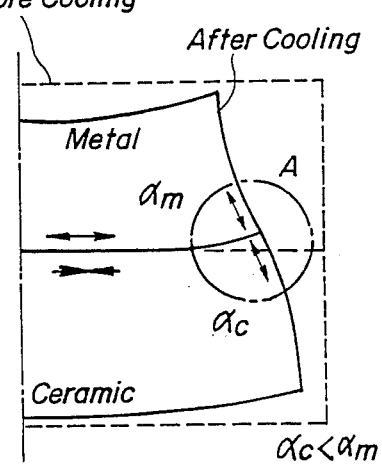

COMPOSITE JOINED BODIES INCLUDING AN INTERMEDIATE MEMBER HAVING A HONEYCOMB STRUCTURE

BACKGROUND OF THE INVENTION

Field of the Invention

The present invention relates to composite joined bodies in which constituent members are joined together through an intermediate member. More particularly, the invention relates to composite joined bodies having a structure which is favorably used for joining together constituent members having different coefficients of thermal expansion, for instance, ceramic members and metallic members.

Related Art Statement

In order to obtain composite joined bodies by butting and joining together members having different coefficients of thermal expansion, there has formerly been known a technique for joining them by direct pressure welding and a technique for joining them through a separate intermediate layer at an interface thereof. For instance, Japanese utility model registration application Laid-open No. 59-160,533 discloses a method of joining a ceramic member and a metallic member through a clad made of a tungsten material or a molybdenum material at an interface thereof as a joining structure.

However, since a residual stress is retained at the joining interface due to difference in thermal expansion in the above-mentioned joining methods, sufficient joining strength cannot be obtained. FIG. 9 shows, by way of example, a metallic member joined to a ceramic member. Assume that the metallic member having a larger coefficient of thermal expansion is joined to the ceramic member having a smaller coefficient of thermal expansion in an intended joined shape before cooling. Once the thus joined composite body is cooled, the metallic member shrinks more than the ceramic member. Thus, as shown in FIG. 9, tensile stress is exerted upon each of the metallic member and the ceramic member at an interface edge "A". As this phenomenon becomes more serious, peeling or cracking at the interface edge "A" will occur.

When a clad made of a tungsten material or a Mo material is used as an intermediate layer, as compared with the above joining of the metallic member and the ceramic member by direct pressure welding, residual stress is reduced to some extent. However, since the intermediate layer is not provided to remove the residual stress at the joining interface, it is not always possible to eliminate peeling and cracking at the interface.

Further, Japanese patent application Laid-open No. 62-182,170 discloses a structure of joining a ceramic member and a metallic member through an insert layer forming a part which is not bonded at least either between a ceramic member and an insert layer or between a metallic member and an insert layer. However, the residual stress is not effectively removed at the joining interface edge because the rigidity of the insert layer is not reduced near the edge portion.

SUMMARY OF THE INVENTION

It is an object of the present invention to provide composite joined bodies each comprising members having different coefficients of thermal expansion, which obviate the above-mentioned problems and can effectively prevent an edge of an interface from peeling or cracking.

It is another object of the present invention to provide composite joined bodies which each comprise members having the same or different coefficients of thermal expansion and in which the members are thermally insulated from each other by a honeycomb structural body.

The composite bodies according to the present invention are characterized in that the constituent members are joined to each other through an intermediate member which is of a honeycomb structure.

The honeycomb structure is used herein to mean not only honeycomb structures which are constituted by linear partition walls arranged in a honeycomb fashion but also those which are constituted by planar or curved strips or plates.

In the above-mentioned construction, rigidity of the intermediate member is reduced by making it as a honeycomb structural body constituted by strips or plates so that stress developed at the time of joining may be absorbed to remove residual stress without damaging joinability between the members. As a result, an interface edge can be prevented from peeling or cracking without damaging the joinability.

The object of the present invention can favorably be attained by making rigidity of the honeycomb structure as the intermediate member smaller toward a joining edge. That is, for instance, when cylindrical members are to be joined together, the rigidity of the honeycomb structure is decreased from a central axis to the outer periphery. By so doing, the rigidity of a zone at which residual stress is more likely to remain can be lowered.

The object of the present invention can also favorably be attained by setting the thickness of the honeycomb structure at 0.5 mm or more. Moreover, a circle, a polygon, an ellipse, and a torus may be employed as the sectional shape of the composite bodies according to the present invention.

These and other objects, features, and advantages of the present invention will be appreciated upon reading the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 3(a) through (e) and FIGS. 4(a) through (d) are sectional views of other intermediate members used in the present invention;

FIG. 7a is a view illustrating a pipe-coupling joint structure embodying the present invention, and FIGS. 7b and 7c are sectional views of FIG. 7a taken along lines VIIb and VIIc of FIG. 7a, respectively FIG. 8 is a sectional view of a ceramic head plate embodying the present invention; and FIG. 9 is a view illustrating the problem possessed by conventional techniques.

DETAILED DESCRIPTION OF THE INVENTION

Figure 1:
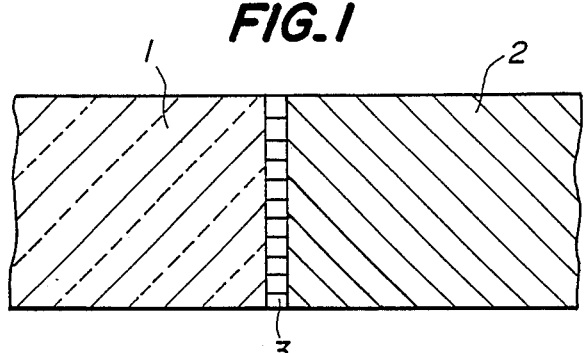
FIG. 1 is a sectional view of an embodiment of the composite joined body according to the present invention.
Figure 2A:
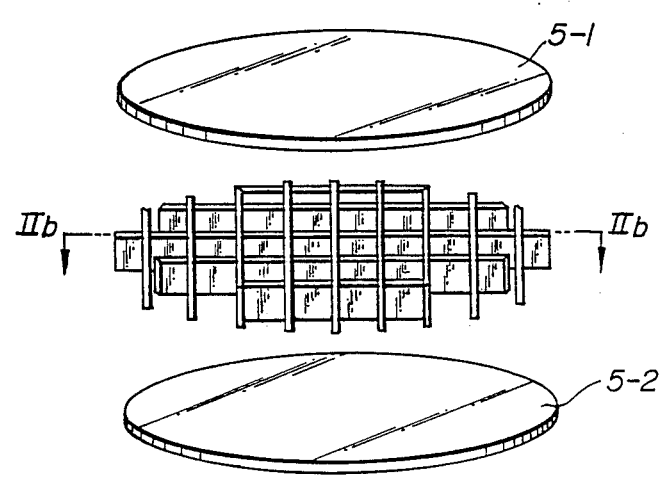
FIGS. 2(a) and (b) are a perspective view in a developed state and a IIb—IIb sectional view of an intermediate layer used in the present invention, respectively.
Figure 2B:
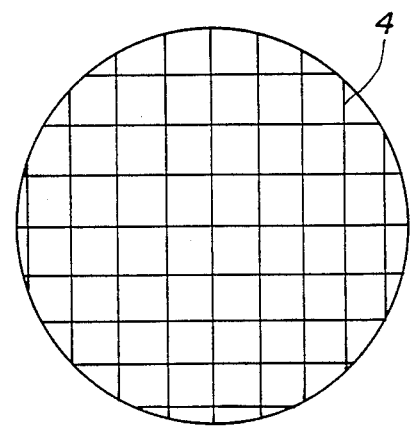

FIG. 1 is a sectional view of an embodiment of the composite joined bodies according to the present invention. In FIG. 1, a cylindrical ceramic member 1 and a cylindrical metallic member 2 having different coefficients of thermal expansion are pressure welded together through a honeycomb structural intermediate member 3 made of Ti, Al, or the like. FIGS. 2(a) and (b) show a developed perspective view and a IIb—IIb sectional view of the intermediate member 3, respectively. As seen in FIGS. 2(a) and (b), the intermediate member 3 is constituted by assembling metal thin strips or plates 4 made of Ti, Al or the like in a lattice fashion, and integrally adhering circular plates 5-1 and 5-2 made of the same metal as that of the metal thin strips or plates 4 to the opposite end faces thereof through welding, brazing or the like. The circular plates 5-1 and 5-2 are provided to increase the contact area and the joining strength between the intermediate member 3 and the ceramic member 1 and the metallic member 2 to be bonded thereto. If the adhering strength between the honeycomb structure and the ceramic member and the metallic member is enough, no circular plates need to be provided.

Although the present invention is applicable to any composite bodies comprising members having different coefficients of thermal expansion, the invention is particularly effective in composite joined bodies comprising metallic members and ceramic members as mentioned above. Ceramic materials used for this purpose may include silicon nitride, silicon carbide, sialon (Si-Al-O-Ni), zirconia, mullite, alumina, beryllia, and the line. As metallic materials, stainless steel, nodular graphite cast iron, nickel-chrome-molybdenum steel, chrome-molybdenum steel, aluminum-chrome-molybdenum steel, maraging steel, precipitation-hardenable type alloy, etc. may be used. It is preferable that a part or the whole part of the metallic member is hardened by precipitation-hardening, nitriding, high frequency hardening or the like. Further, stainless steel, Ti, Ni, W, Nb Cu or Ta, or an alloy thereof may be used as the intermediate member.

The joining may be carried out by brazing, diffusion bonding, melting bonding, combination thereof, or the like.

FIGS. 3 and 4 are sectional views showing other examples of intermediate members used in the present invention. In the intermediate members shown in FIGS. 3(a) through (d), rigidity is made smaller toward the joining edge, that is, toward the outer periphery. FIG. 3(a) shows an example in which a space between adjacent lattice strips in the honeycomb structure is made greater toward the outer periphery. In FIGS. 3(b), a radial space between adjacent concentrical partition walls is made greater toward the outer periphery. FIG. 3(c) shows an example in which rigidity in the radial direction is adjusted by forming the outermost peripheral portion in a concentrically petalous fashion. In FIG. 3(d), rigidity in the radial direction is adjusted by swirly partition walls. FIG. 3(e) shows an example in which rigidity is made smaller in the radial direction than that in the intermediate member of FIGS. 2(a) and (b) by a twill-like pattern.

FIGS. 4(a) through (d) show honeycomb structural intermediate members having various annular sections. In any of these examples, residual stress can effectively be reduced.

In the following, embodiments of the present invention will be explained. These embodiments are merely given in illustration of the invention, but should never be interpreted to limit the scope thereof.

EXAMPLES

Figure 5:
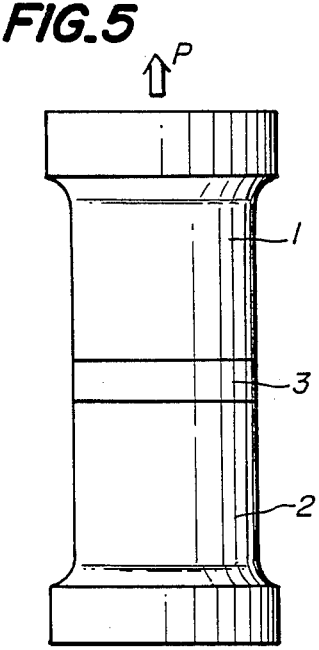
FIG. 5 is a front view of a composite joined body used in a tensile test.
Figure 6A:
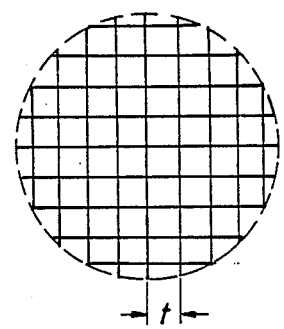
FIGS. 6(a), (b) and (c) are a cross sectional view and a vertical sectional view of the composite joined body shown in FIG. 5, and a view illustrating a way of making a honeycomb structural body, respectively.
Figure 6B:
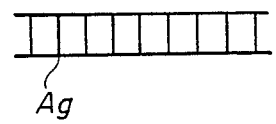
Figure 6C:
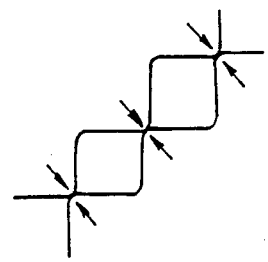

As shown in FIG. 5, a ceramic member 1 made of $Si_3N_4$ having an outer diameter of 30 mm was joined to a metallic member 2 made of S45C through an intermediate member 3 made of Ti having a thickness of 5 mm by soldering with silver solder. As shown in a cross sectional view and a vertical sectional view of FIGS. 6(a) and (b), respectively, the intermediate member 3 is constituted by assembling a honeycomb structure at a pitch "t" from Ti strips or plates having a thickness of 0.2 mm through spot welding as shown in FIG. 6(c) and soldering circular plates made of Ti having a thickness of 0.2 mm to upper and lower end faces of the honeycomb structure.

In the thus obtained composite bodies, Run Nos. 1–3 (Group I) of the present invention in which the pitch "t" was all set at 3 mm, Run Nos. 4–6 (group II) of the present invention in which the pitch was stepwise changed at 3 mm, 4 mm and 5 mm from the central portion to the peripheral portion, and Run Nos. 7 to 9 made of a 5 mm thick Ti plate with a non-honeycomb structure as an intermediate member were prepared. Tensile tests were carried out with respect to the composite bodies. Results are shown in Table 1.

TABLE 1

| | | Run No. | Fracture load P (Kg · f) |
|---|---|---|---|
| Present invention | (I) | 1 | 1,020 |
| | | 2 | 1,310 |
| | | 3 | 1,270 |
| | (II) | 4 | 1,800 |
| | | 5 | 1,760 |
| | | 6 | 1,690 |
| Comparative Example | | 7 | 530 |
| | | 8 | 720 |
| | | 9 | 590 |

It is seen from the results in Table 1 that Run Nos. 4 to 7 of the present invention (Group II) in which rigidity was decreased toward the joining peripheral edge could withstand higher tensile loads as compared with Comparative Examples.

FIGS. 7 and 8 show examples actually embodying the present invention. FIG. 7 shows a joint coupling for a pipe to be exposed to a gas, a liquid and a vacuum atmosphere inside and outside thereof. A ceramic pipe 7-1 is joined to a metallic pipe 7-3 through an annular honeycomb structural intermediate member 7-2. In this embodiment, the honeycomb structure mitigates stress due to difference in thermal expansion between the ceramic material and the metallic material and also seals the joint portion.

FIG. 8 shows an example of a head plate embodying the present invention. A head plate 8-1 made of $Si_3N_4$ is joined to a cylinder head 8-2 through a honeycomb structural intermediate member 8-3 made of Ti. In this example, the honeycomb structure mitigates stress, effects heat insulation, and simplifies sealing between the head plate and the cylinder head at the inside of the valve holes.

As is clear from the above-detailed description, according to the composite joined bodies in which constituting members are joined together through the intermediate member, rigidity of the joint portion is reduced by designing the intermediate member as a honeycomb structure. As a result, even when the composite joined bodies are formed through the intermediate member, the interface can be prevented from peeling or cracking without damaging the joining strength. Further, also when members having the same coefficient of thermal expansion are to be joined together, they can thermally be isolated from each other without damaging the joining force between the members. Thus, the present invention is effective for joining ceramic gas turbine parts such as ceramic gas turbine stationary and moving blades, ceramic diesel engine parts such as head plates, ceramic parts for electrically insulating NaS cells, and the line.

What is claimed is:

1. A bonded composite article comprising:
   a first member having a first thermal expansion coefficient;
   a second member having a second thermal expansion coefficient which is different from said first thermal expansion coefficient; and
   an intermediate member interposed between said members, said intermediate member comprising a honeycomb structure;
   wherein said first member and said second member are bonded together through said intermediate member, and said intermediate member prevents residual stress in said bonded composite article due to a difference between said first and second thermal expansion coefficients.

2. A bonded composite article according to claim 1, wherein the honeycomb structure of said intermediate member has a thickness of at least 0.5 mm.

3. A bonded composite article according to claim 1, wherein at least a part of the intermediate member has a sealing structure.

4. A bonded composite article according to claim 1, wherein the intermediate member is made of Ti.

5. A bonded composite article according to claim 1, wherein the constituent members are a ceramic member and a metallic member.

6. A bonded composite article according to claim 5, wherein the ceramic member is made from a ceramic material selected from the group consisting of silicon nitride, silicon carbide, sialon, zirconia, mullite, alumina, and beryllia.

7. A bonded composite article body according to claim 5, wherein the metallic member is made from a metal selected from the group consisting of stainless steel, nodular graphite cast iron, nickel-chrome-molybdenum steel, chrome-molybdenum steel, aluminum-chrome-molybdenum steel, maraging steel, and precipitation hardenable type alloy.

8. A bonded composite article according to claim 7, wherein at least a part of the metallic member is hardened by a treatment selected from the group consisting of precipitation hardening, nitriding, and high frequency wave hardening.

9. A bonded composite article according to claim 1, wherein the intermediate member is made from a material selected from the group consisting of stainless steel, Ni, W, Nb, Cu, Ta and an alloy thereof.

10. A bonded composite article according to claim 1, wherein the constituent members are joined together through the intermediate member by a process selected from the group consisting of brazing, diffusion bonding, melting bonding, and combinations thereof.

11. A bonded composite article comprising:
    a first member having a first thermal expansion coefficient;
    a second member having a second thermal expansion coefficient; and
    an intermediate member interposed between said members, said intermediate member comprising a honeycomb structure having a structural rigidity which decreases from a central portion thereof towards a peripheral edge of a joining interface between the first and second members;
    wherein said first member and said second member are bonded together through said intermediate member, and said intermediate member prevents residual stress in said bonded composite article.

12. A bonded composite article according to claim 11, wherein said second thermal expansion coefficient is different from said first thermal expansion coefficient.

* * * * *